June 26, 1951 S. BREEN 2,558,669

APPARATUS TRIGGERED BY RECORDED SIGNALS

Filed March 27, 1948 4 Sheets-Sheet 1

INVENTOR.
STANLEY BREEN
BY Robert L Kahn
Attorney

June 26, 1951 S. BREEN 2,558,669

APPARATUS TRIGGERED BY RECORDED SIGNALS

Filed March 27, 1948 4 Sheets-Sheet 2

INVENTOR.
STANLEY BREEN
BY Robert L Kahn
Attorney

June 26, 1951 S. BREEN 2,558,669

APPARATUS TRIGGERED BY RECORDED SIGNALS

Filed March 27, 1948 4 Sheets-Sheet 3

INVENTOR.
STANLEY BREEN.
BY Robert L. Kahn
Attorney

APPARATUS TRIGGERED BY RECORDED SIGNALS

Filed March 27, 1948 4 Sheets-Sheet 4

INVENTOR.
STANLEY BREEN.
BY Robert L. Kahn
Attorney

Patented June 26, 1951

2,558,669

UNITED STATES PATENT OFFICE 2,558,669

APPARATUS TRIGGERED BY RECORDED SIGNALS

Stanley Breen, Geneva, Ill., assignor to Operadio Manufacturing Co., St. Charles, Ill., a corporation of Illinois Application March 27, 1948, Serial No. 17,501

5 Claims. (Cl. 274—1)

This invention relates to an electrical apparatus and particularly to a pick-up accessory for use in a synchronized film strip sound reproducing system. While the invention may be used in various kinds of phonograph systems, advertising displays, etc. the invention herein has particular application to those systems wherein a sound record disc carries "sub-audible" sounds thereon for triggering the advance of a picture frame of the strip film at desired times during sound reproduction.

As a rule in systems as described above, a trigger signal of about 40 cycles per second is used, this being well below the frequency range which the reproduction system is designed to handle. Hence the trigger signal may be considered "sub-audible" as far as listeners are concerned. The trigger signal and normal reproduction frequencies at the stylus are fed to a common transducer in prior art devices and thereafter frequency separation is accomplished by electric filters. While electric filters may be designed to have any desired characteristics, they generally lack sharp selectivity at low audio frequencies and such circuits have low Q's. It is well known that Q represents the efficiency of energy storage in a system. Thus in an electrical system the ratio of reactance to ohmic resistance is the Q of the system and indicates a measure of the sharpness and height of a resonance peak. Similarly in a mechanical system, the ratio of mechanical reactance to mechanical resistance may be defined as the Q of the system with analogous properties. This property of electric filters gives rise to several serious drawbacks.

Thus for conventional sound reproduction, it is customary to have a low frequency cut off at about 75 cycles per second in order to eliminate any possible 60 cycle hum. Due to poor selectivity, it is necessary to have the trigger signal frequency far lower than the lowest sound frequency to be handled. This raises the problem of sufficient amplitude for a trigger signal to be effective. If the signal amplitude as recorded on the disc is to be moderate then special means are necessary to build up the trigger amplitude to a usable value suitable for actuation of a control or signal. However at such low frequencies this is difficult to accomplish without great expense, as with amplifiers.

The art has handled this problem by relying upon great signal amplitude at the trigger frequency for recording on the record. Thus when reproduction occurs, the great trigger frequency amplitude at the stylus will provide potentials of sufficient amplitude, so that in spite of the pick-up cut off characteristics, there will still be sufficient energy for operation. Thus brute force or shock excitation of the electrical system is relied upon for operation. This has been found to be objectionable in producing intermodulation of adjacent tracks.

A further difficulty is due to the sensitivity of such a system to spurious triggers. Since the electrical system has a low Q, it is evident that there is little build-up in amplitude because of resonance. Furthermore a low Q system does not require many cycles at resonant frequency for energy to build up to its maximum since the maximum is little larger than applied signal amplitude. Hence noise or other disturbances having a trigger frequency component may easily affect such a system and result in spurious operation.

This invention provides a pick-up and system therefor which makes it possible to have an efficient and economical strip film sound reproduction system and eliminates the necessity for high amplitude trigger frequency recording. A system embodying the present invention relies upon a mechanical element having a resonance and Q characteristic which may be as sharp as desired. By having sharp resonance characteristics, it is possible to use a trigger frequency at any desired point along the frequency spectrum below the usual cut off. Furthermore, by having a high Q system, it is possible to utilize a low amplitude trigger signal and rely upon duration of the trigger signal for proper operation of the system. This has the great advantage that such a system is relatively insensitive to transients which might ordinarily shock excite the system and produce a spurious response. The higher the Q the greater the amplitude build-up toward the resonance peak and the more trigger cycles are required for the build-up process.

Thus a system utilizing the present invention makes it possible to record trigger frequencies at any desired low amplitude and makes the entire system relatively insensitive to shock or transient excitation or operation. In addition, the improved system is simpler and less costly to design and to make. A system embodying the present invention may generate a signal for an operator to advance a frame in a simple manual system or may initiate the frame advance itself in an automatic system or may be used in a combination system having both automatic frame advance and signal to an operator for supervisory control.

In general a system embodying the invention provides mechanical means accessory to any conventional pick-up which means are resonant to the trigger frequency and which when energized by the trigger frequency will initiate a manual or automatic cycle for changing a film frame. It has been found that for "sub-audible" frequencies used for triggering, a tone arm will have substantial vibration therein irrespective of the construction of pick-up. Thus the resonant mechanical means may be disposed in intimate relation to the pick-up or the tone arm and will receive trigger frequencies from the stylus. Such a construction is highly advantageous since it permits the use of conventional pick-ups for use in conventional sound reproduction.

The resonant means for responding to trigger frequencies may comprise one or more spring reeds provided with suitable visual or contact means for indicating when a trigger frequency is present. The visual means for indicating reed vibration may comprise a simple flag which may operate in conjunction with suitable lights or fluorescing materials for permitting visual observation of reed vibration. Contact means for reeds are well known in vibrators for automobile radios and the like and such contact means may control suitable circuits for indicating reed vibrations or initiating frame advance cycles.

For a more complete understanding of the invention, reference may now be made to the drawings wherein Figure 1 shows an elevation of a system embodying the present invention, with part of the tone arm cut away.

Figure 1:
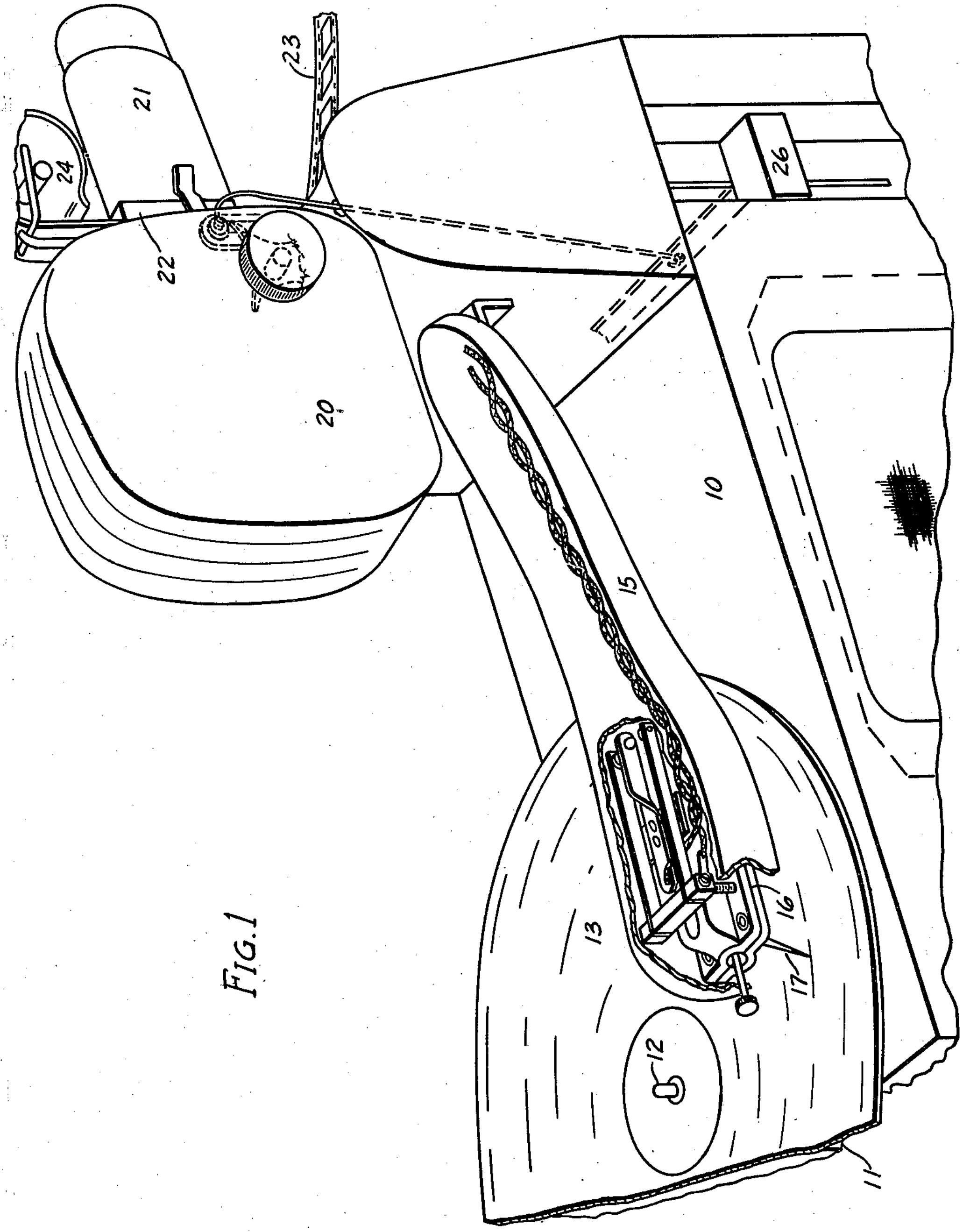

Referring now to Figure 1, cabinet 10 of any suitable material may be provided. Mounted for rotation in cabinet 10 is turntable 11 supported on spindle 12 driven by a suitable motor not shown. Adapted to rest upon turntable 11, is record 13 containing the sound or music to be reproduced and also containing "sub-audible" trigger signals for advancing a film frame.

Suitably supported from a section of the cabinet structure is tone arm 15 carrying pick-up 16. Pick-up 16 may be any one of various forms readily available and has stylus 17 for cooperation with record 13.

Suitably supported on cabinet 10 or, if desired disposed in a separate cabinet, is projector 20 having lens barrel 21 and film gate 22 through which film strip 23 is adapted to pass. Guide 24 for holding the film strip may be provided in the usual fashion.

The film may be advanced through film gate 22 one frame at a time by any suitable means well known in the art. This means may either be manual or may be automatic, controlled by or actuated by a motor or other source of power. A single film advance may be manual and may be controlled by lever 26 sliding in a suitable portion of cabinet 10.

An amplifier and speaker may be housed in cabinet 10, these cooperating with the pick-up to provide sound reproduction. Additional means such as condensers, resistors and relays as required may be disposed in cabinet 10.

Figure 2:
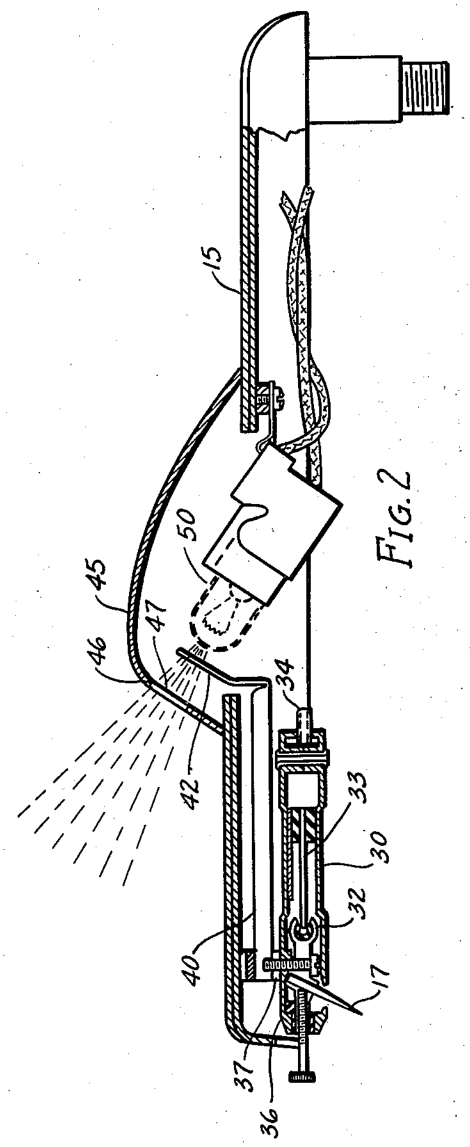
Figure 2 is a sectional elevation of a tone arm having one form of a pick-up embodying the present invention.
Figure 3:
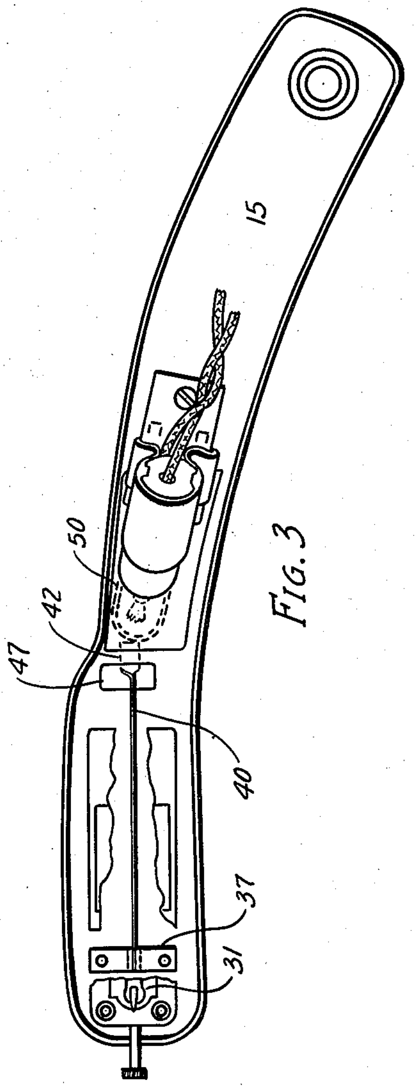
Figure 3 is a bottom view with certain parts broken away of the tone arm and pick-up shown in Figure 2.

Referring now to Figures 2 and 3, one form of pick-up embodying this invention will be described. This pick-up comprises conventional structure 30 here shown utilizing a piezo-crystal for translating mechanical movement into electrical potentials. Any other type of pick-up may be used. Pick-up 30 has stylus 17 clamped in chuck 31 driving torsion rod 32.

Torsion rod 32 is connected in a suitable manner to generate electric potentials in crystal 33. The output of crystal 33 is taken from terminals 34. The pick-up structure is housed in cartridge 36. Attached to the top of cartridge 36 is support 37. Support 37 is preferably disposed near chuck 31 and support 37 has rigidly attached thereto flexible reed 40 extending longitudinally along the pick-up. Reed 40 is flat and in the normal position lies in a vertical plane. Reed 40 extends along the top of and clear of the pick-up cartridge. The reed extends for a substantial distance along the pick-up cartridge and at its end may carry flag 42. Flag 42 may simply consist of thin flat strip of metal such as steel, aluminum, brass or the like.

As is evident from Figure 2, the entire pick-up including the reed is disposed within portion 43 of a tone arm. Tone arm 15 is provided with elevated portion 45 having portion 46 suitably perforated or slotted at 47. Part 47 of the tone arm material, which may be of metal or plastic as desired, is adapted to register with flag 42.

Carried by the tone arm within elevated portion 45 is electric light 50 which may be supplied by current from any suitable source. It is evident that when lamp 50 is lit, it will be possible to see flag 42 and observe whether it is at rest or in vibration. Thus the rest position of the flag may obscure the light. Upon flag vibration, the light will be visible. It is also possible to coat flag 42 or the reed edge with fluorescing paint as used on clocks. This will eliminate the necessity for lamp 50.

The pick-up shown in Figures 2 and 3 is adapted to provide a visual signal to an operator for flashing and warning the operator to actuate the film advance. Reed 40 is preferably tuned to a suitable frequency such as 40 cycles per second for example. When stylus 17 encounters a 40 cycle portion of the record groove, the resonance of the reed will permit vibration at that frequency. It has been found, that no direct mechanical coupling between the stylus and the reed is necessary. Any conventional pick-up construction may be used and the reed may be mounted upon a suitable portion of the pick-up cartridge. While the reed is shown as being mounted on top of the pick-up, this is not essential. It is evident, however, that the top face of the cartridge will be most convenient for mounting the reed. The entire pick-up may be bolted to the tone arm in any desired manner.

A pick-up with one reed is quite sharp and requires that the trigger frequency be accurate. It is possible to provide several reeds, each one being tuned to a slightly different frequency to provide a broad response frequency range. Such a multiple reed construction using electrical contacts is disclosed in Figures 4 and 5 to be next described. It is obvious, however, that the multiple reed construction to be described in connection with Figures 4 and 5 may be readily applied to the construction shown in Figures 2 and 3.

Figure 4:
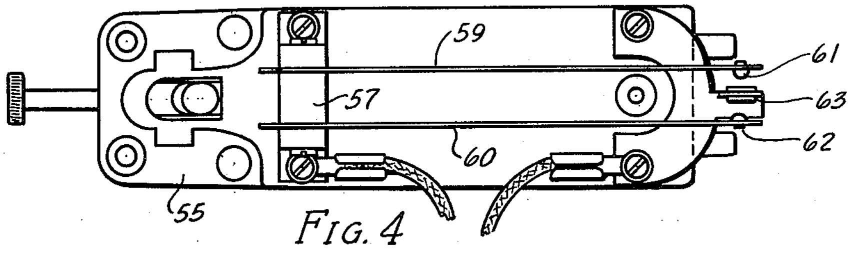
Figure 4 is a top view of a modified form of pick-up embodying the present invention.
Figure 5:
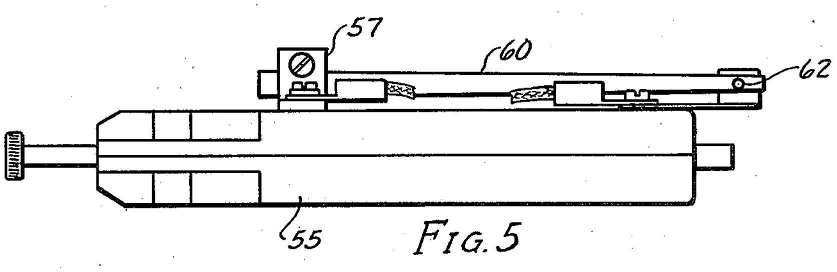
Figure 5 is a side elevation of the pick-up of Figure 4.

Referring now to Figures 4 and 5, pick-up 55 of any desired construction may be provided. Mounted at the top face of the pick-up cartridge in a manner generally resembling that in Figures 2 and 3, are supporting blocks 57 upon which are rigidly secured a plurality of reeds here shown as two and numbered 59 and 60. Reeds 59 and 60 have different resonance frequencies. Thus reed 59 may be tuned to 39 cycles per second while reed 60 may be tuned to 41 cycles per second. It is clear that a frequency range of 30 to 41 may be used for trigger purposes in connection with a trigger frequency of 40 cycles per second. From this 40 c. p. s. value, some variation from either side due to changes in motor speed may be tolerated and still permit the pick-up reeds to operate.

Pick-up reeds 59 and 60 are adapted to control electric circuits rather than provide a visual signal to an operator for changing a frame. To this end, reed 59 carries contact 61 while reed 60 carries contact 62. Between these movable reed contacts is disposed stationary contact 63 for cooperation with both movable contacts. The spacing between contact 63 and the movable contacts carried by the reeds should be small enough so that the reed contacts will touch the stationary contacts when reed vibration has attained maximum amplitude. If desired, stationary contact 63 may be provided with suitable means for controlling the spacing between the fixed contacts and the corresponding reed contact. Inasmuch as vibrating reeds are well known in the art, particularly in connection with relays and vibrators for automobiles, radios and the like, no detailed description of reed or contact mounting is deemed necessary.

Since reeds 59 and 60 are both relied upon for controlling one system, the two reeds are connected together electrically at their point of support. It is preferred in all cases to have the stationary end of the reed at the portion of the pick-up immediately adjacent the stylus. While other dispositions of the reed with respect to the pick-up probably may be made, most efficient and effective reed action is obtained with the relationship shown.

Figure 6:
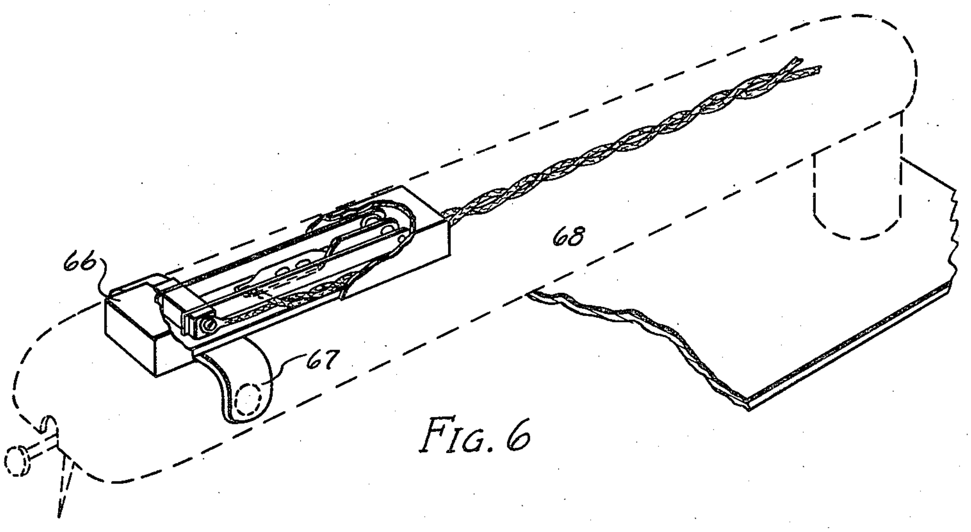
Figure 6 shows a form of invention as a separable accessory for ready application to any tone-arm.

It has been found that the trigger frequency responsive members need not necessarily be attached directly to the pick-up cartridge but may be attached to the tone arm. Thus a separable attachment containing one or more reeds with visual or electric control means may be disposed above the top of the tone arm as shown for example in Figure 6. Thus cartridge 66 containing a trigger frequency responsive means may be provided with spring clips 67 for attachment to tone arm 68. It is also possible to merely dispose cartridge 66 against the tone arm and tie it in place with tape. Trigger frequencies at the stylus tip will cause tone arm vibration and thus actuate the reed structure. Obviously any wire leads which may be required may be taped to the tone arm along the length thereof and led to suitable points. Cartridge 66 may include the grating construction of Figures 2 and 3 if desired. In fact the cartridge may include any features or details which may be used with the constructions disclosed in Figures 2 to 5 inclusive.

Figure 7:
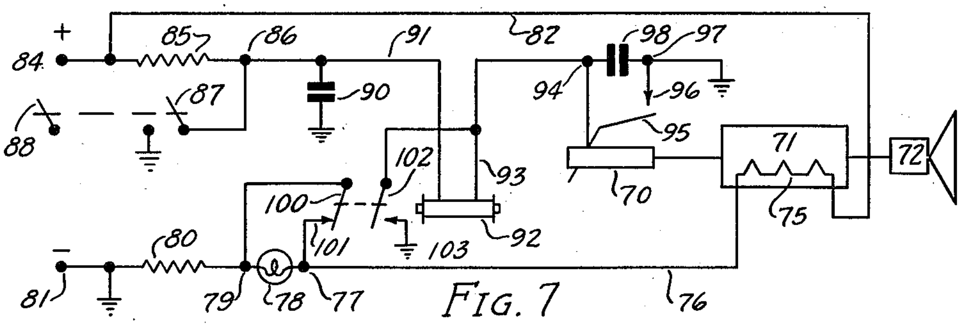
Figure 7 is a circuit diagram of a system using the pick-up of the present invention.

Referring now to Figure 7, there is a diagrammatic showing of a circuit for electrical contact type of reed. In this circuit, pick-up 70 feeds its output to amplifier 71 and the output of this amplifier goes to speaker 72. Amplifier 71 may be of the type having a number of vacuum tube filaments or heaters 75 in series or in parallel as the case may be. The heater filaments are connected at the one side to line 76 and to terminal 77. Connected to terminal 77 is lamp or indicating means 78. The other terminal 79 of the lamp is connected through resistor 80 to grounded terminal 81 of the system. The other terminal of the tube filaments 75 is connected by wire 82 to terminal 84. Terminals 81 and 84 are adapted to be connected to any suitable source of direct current.

Connected to terminal 84 is resistor 85 going to junction 86. From junction 86 a connection is made to switch 87 which is mechanically tied to lever 88. Lever 88 is adapted to form part of the means for advancing film one frame at the projector gate.

Connected to terminal 86 is condenser 90. This condenser is grounded. From terminal 86 connection 91 goes to the winding of relay 92 having movable and fixed contacts. The winding of relay 92 is connected by lead 93 to junction 94. From junction 94 a lead goes to reed 95. Contact 96 of the reed or with which the reed cooperates, is connected to point 97. While only one reed is shown, it is understood that the two reeds disclosed in Figures 4 and 5 may be used. A greater number of reeds than two is also possible, each one tuned to a slightly different frequency.

Connected between points 94 and 97 and thus effectively across the two reed contacts is condenser 98. This condenser is of a suitable value to minimize arcing. Point 97 is connected to ground.

The operation of the system shown in Figure 7 is as follows: Normally reed 95 and contact 96 is open. Condenser 90 is charged to a suitable value through resistor 85. As shown, relay 92 is open and lamp 78 is short-circuited by movable relay contact 100 cooperating with fixed contact 101. Now assume that reed 95 is vibrated by a trigger signal in the record groove. Closure of the circuit with contact 96 will cause condenser 90 to discharge. This circuit may be traced from ground at condenser 90 through relay 92 and through the reed contact to terminal 97 and thence ground. Relay 92 will thereupon be energized and will pull contact 100 away from contact 101. At the same time it will pull movable contact 102 toward grounded contact 103 and close this circuit. Movable contact 102 is connected to line 93. Thus it will be evident that a circuit from terminal 84 through resistor 85 through relay winding 92, movable contact 102 and grounded contact 103 will be provided for holding the relay locked in spite of any opening of the contact at the reed.

With the relay in closed position, the short circuit across lamp 78 will be broken and this lamp will be lit up for indicating to the operator that a frame should be advanced.

It is, of course, possible to have a separate source of potential connected to lamp 78 and have this circuit closed when the relay is energized.

The operator advances the film one frame, lever 88 being moved, and this causes grounded switch 87 to close. This cuts off relay 92 by shorting the winding out and permitting the system to come back to the condition shown in the figure.

It is obvious that lamp 78 may be replaced by any suitable motor or electromagnet for advancing the film one frame at a time. This motor or electromagnet will operate lever 88 so that the system will come back to its proper condition for a new operating cycle.

Figure 8:
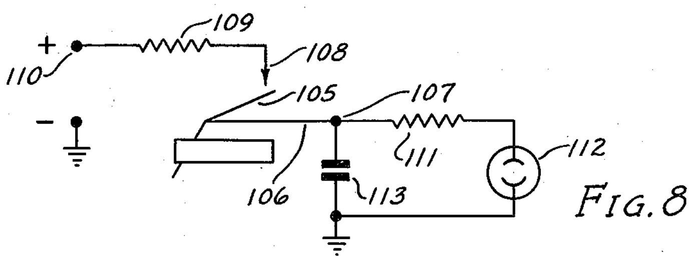
Figure 8 is a circuit detail of another circuit in which a pick-up embodying the present invention may be used.

The operating circuit illustrated above in Figure 7 may be modified as conditions require. Thus in Figure 8 reed contact 105 is connected by lead 106 to junction 107. Reed contact 108 is connected through resistor 109 to terminal 110. Terminal 110 is connected to one terminal of a suitable power source, such as the output of a rectifier for example. The other terminal is grounded. Junction 107 is connected through resistor 111 to grounded gas lamp 112. Condenser 113 is connected between junction 107 and the grounded terminal of the power source. Upon reed vibration, current will flow through resistor 109 to charge condenser 113. It is understood that resistor 109 will be small to permit the condenser to charge within a few cycles of reed vibration. When the condenser has been charged to a suitable potential, gas lamp 112 will glow and warn the operator that a frame must be advanced. Such a system may be made to have a relatively slow time response so that continued vibration of the reed structure will be necessary for operation.

Figure 9:
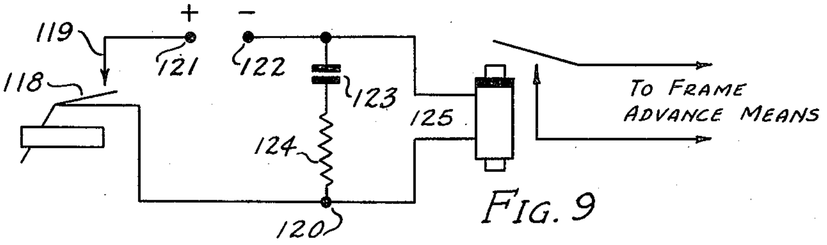
Figures 9 and 10 are circuit diagrams of still different circuits utilizing the pick-up of the present invention.

Referring now to Figure 9 a modified circuit for automatic control of a film frame advancing means is shown. In this circuit reed contacts 118 and 119 are connected to junction points 120 and 121 respectively. Between junction 121 and 122 may be connected a source of direct potential. Between junction 122 and 120 are connected condenser 123 and resistor 124 in series. Across junctions 122 and 120 is also connected relay 125 of the slow release type. Such relays with a shorting copper ring are well known and are fast to close and slow to release. Upon closure of reed contacts, charging current will flow into condenser 123 and relay 125 will be operated when the condenser has been charged to a suitable point. If desired, a pair of holding contacts for the relay may be bridged across the reed contacts so that once the reed contacts are closed and operate the relay, the relay will thereafter hold independently of the reed contacts. In such case, it will be necessary to provide a switch for opening the relay holding circuit. Such switch may be controlled by the frame advancing means in a manner generally resembling the control of switch 87 in Figure 7.

Figure 10:
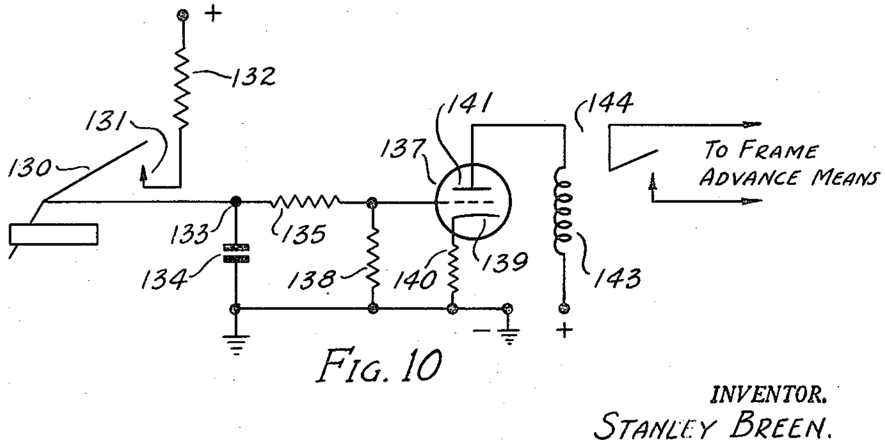

Referring to Figure 10 movable reed 130 cooperates with fixed contact 131 connected through resistor 132 to the positive pole of the suitable source of high potential. Reed 130 is connected to junction 133. Grounded condenser 134 is connected to junction 133. Junction 133 is connected through resistor 135 to control grid 136 of vacuum tube 137. Grid 136 is connected to ground by resistor 138. Cathode 139 is biased by resistor 140 going to ground. The negative terminal of the high potential source is connected to ground. Anode 141 of the vacuum tube is connected through winding 143 of relay 144 to the positive terminal of a high potential source, which source may be the same as the previous source. Under normal conditions, vacuum tube 137 is maintained practically at cut-off by the high cathode bias resistor. However upon reed vibration, contacts 130 and 131 will close long enough to charge condenser 134 and impress a high positive bias upon grid 136. This will cause a heavy current to flow through the tube and relay winding and operate the relay In all the above circuits it is understood that multiple reeds may be used and that the direct source of potential may be rectified power. The polarities of the potential sources may be reversed in many instances.

In certain instances it may be desirable to have the reed resonant to a superaudible frequency. Thus most sound reproducing systems of moderate quality have an upper frequency cut-off of between about 5000 and 7500 cycles per second. It is possible to have a reed or system of reeds resonant to a frequency or range of frequencies above this cut-off.

The various modifications are described in connection with a laterally cut groove. It is evident that the invention may be used in connection with hill and dale records in which case the plane of the reed or reeds would be generally horizontal rather than vertical.

What is claimed is:

1. For use in a composite system in which is included a sound-reproducing system having a stylus, pick-up and tone arm cooperating with a sound record, said composite system also including means to be triggered at various times during sound reproduction by signals at a definite frequency carried by said record, said sound reproducing system as a whole having a normal range of audiofrequencies for sound reproduction with the signals on said record having a frequency below sound cut-off frequency, said signal frequency being high enough so that a substantial number of complete cycles at moderate amplitude can be recorded along the sound track for a record revolution, an attachment for the tone arm comprising a base to be attached to the tone arm in proximity to the said stylus, a sharply resonant reed having one end rigidly secured to said base and a contact at the free end thereof, a fixed contact carried by said base for cooperation with said reed contact, said two contacts closing only when said reed is vibrating with substantial amplitude, said reed resonant frequency matching the recorded signal frequency and the reed having substantial energy storage characteristic so that transients do not affect the reed, said trigger means being controlled by the contacts.

2. The structure of claim 1 wherein said base carries two reeds having overlapping resonant frequency response characteristics, each reed having its own contact whereby some variation of signal frequency is permissible.

3. In combination, a composite system including a sound reproducing system having a stylus, pick-up and tone arm cooperating with a sound record, means to be triggered at various times during sound reproduction by signals at a definite frequency carried by said record, said sound reproducing system as a whole having a normal range of audiofrequencies for sound reproduction with the signals on said record having a frequency below sound cut-off frequency, said signal frequency being high enough so that a substantial number of complete cycles at moderate amplitude can be recorded along the sound track for a record revolution, a sharply resonant reed having one end rigidly secured with respect to said tone arm and vibratorily connected to said sound reproducing stylus, said reed carrying a contact at its free end, a fixed contact carried by said tone arm, said two contacts closing only when said reed is vibrating with substantial amplitude, said reed resonant frequency matching the recorded signal frequency and the reed having substantial energy storage characteristic so that transients do not affect the reed and circuit means controlled by said contacts for operating said trigger means.

4. For use in a composite system in which is included a sound-reproducing system having a stylus, pick-up and tone arm cooperating with a sound record, said composite system also including means to be triggered at various times during sound reproduction by signals at a definite frequency carried by said record, said sound reproducing system as a whole having a normal range of audiofrequencies for sound reproduction with the signals on said record having a frequency beyond sound cut-off frequency, said signal frequency being high enough so that a substantial number of complete cycles at moderate amplitude can be recorded along the sound track for a record revolution, an attachment for the tone arm comprising a base to be attached to the tone arm in proximity to the said stylus, a sharply resonant reed having one end rigidly secured to said base and a contact at the free end thereof, a fixed contact carried by said base for cooperation with said reed contact, said two contacts closing only when said reed is vibrating with substantial amplitude, said reed resonant frequency matching the recorded signal frequency and the reed having substantial energy storage characteristic so that transients do not affect the reed, said trigger means being controlled by the contacts.

5. In combination, a composite system including a sound reproducing system having a stylus, pick-up and tone arm cooperating with a sound record, means to be triggered at various times during sound reproduction by signals at a definite frequency carried by said record, said sound reproducing system as a whole having a normal range of audiofrequencies for sound reproduction with the signals on said record having a frequency beyond sound cut-off frequency, said signal frequency being high enough so that a substantial number of complete cycles at moderate amplitude can be recorded along the sound track for a record revolution, a sharply resonant reed having one end rigidly secured with respect to said tone arm and vibratorily connected to said sound reproducing stylus, said reed carrying a contact at its free end, a fixed contact carried by said tone arm, said two contacts closing only when said reed is vibrating with substantial amplitude, said reed resonant frequency matching the recorded signal frequency and the reed having substantial energy storage characteristic so that transients do not affect the reed and circuit means controlled by said contacts for operating said trigger means.

STANLEY BREEN.

REFERENCES CITED

The following references are of record in the file of this patent:

UNITED STATES PATENTS

| Number | Name | Date |
|---|---|---|
| 1,895,614 | Elliott | Jan. 31, 1933 |
| 1,909,765 | Jenkins et al. | May 16, 1933 |
| 1,987,544 | Wood et al. | Jan. 8, 1935 |
| 2,066,538 | Phelps | Jan. 5, 1937 |
| 2,141,203 | Abbott | Dec. 27, 1938 |
| 2,163,195 | Edwards | June 20, 1939 |
| 2,219,803 | Bourne | Oct. 29, 1940 |
| 2,279,119 | Freemann | Apr. 7, 1942 |